(12) United States Patent
Maroney

(10) Patent No.: US 9,660,402 B2
(45) Date of Patent: May 23, 2017

(54) CONDUCTOR ASSEMBLY FOR POWER DISTRIBUTION EQUIPMENT

(71) Applicant: S&C Electric Company, Chicago, IL (US)

(72) Inventor: Michael R. Maroney, Chicago, IL (US)

(73) Assignee: S&C ELECTRIC COMPANY, Chicago, IL (US)

( * ) Notice: Subject to any disclaimer, the term of this patent is extended or adjusted under 35 U.S.C. 154(b) by 0 days.

(21) Appl. No.: 15/188,411

(22) Filed: Jun. 21, 2016

(65) Prior Publication Data

US 2016/0301170 A1   Oct. 13, 2016

Related U.S. Application Data

(63) Continuation of application No. 14/682,199, filed on Apr. 9, 2015, now Pat. No. 9,385,493.

(60) Provisional application No. 61/977,992, filed on Apr. 10, 2014.

(51) Int. Cl.
*H01R 25/16* (2006.01)
*H01R 4/50* (2006.01)
*H02B 13/00* (2006.01)

(52) U.S. Cl.
CPC ............ *H01R 25/162* (2013.01); *H01R 4/50* (2013.01); *H02B 13/005* (2013.01)

(58) Field of Classification Search
CPC .... H01R 25/16; H01R 25/161; H01R 25/162; H01R 25/164; H01R 25/165; H01R 25/167; H01R 25/168; H01R 4/50; H01R 13/53

USPC .................. 439/8, 252, 10, 32, 33, 921, 920
See application file for complete search history.

(56) References Cited

U.S. PATENT DOCUMENTS

| | | | | |
|---|---|---|---|---|
| 3,401,370 A | * | 9/1968 | Weinfurt ................ | H01R 13/53 174/11 BH |
| 3,474,386 A | * | 10/1969 | Link ...................... | H01R 13/53 439/181 |
| 3,509,516 A | * | 4/1970 | Phillips .................. | H01R 13/53 174/18 |

(Continued)

FOREIGN PATENT DOCUMENTS

CN    103066500 A    4/2013
DE    102007003636 A1    7/2008

(Continued)

OTHER PUBLICATIONS

United States International Searching Authority, International Search Report and Written Opinion for International Application No. PCT/US2015/025230 mailed Jul. 9, 2015.

(Continued)

*Primary Examiner* — Ross Gushi
(74) *Attorney, Agent, or Firm* — Lorenz & Kopf, LLP

(57) ABSTRACT

A conductor assembly for establishing a connection to a power distribution unit is disclosed. The conductor assembly includes one or more conductors have a conductive rod. Each end of the conductive rod has an end forming a ball member. The conductor assembly also includes a connector having a clamp mechanism to receive the ball member of the conductive rod. A fastener threadably couples with a conductor on power distribution unit to rigidly secure the conductor assembly to the electrical equipment units.

18 Claims, 6 Drawing Sheets

(56) References Cited

U.S. PATENT DOCUMENTS

| | | | | |
|---|---|---|---|---|
| 3,509,518 A * | 4/1970 | Phillips | H01R 4/4863 | 174/70 R |
| 3,534,323 A * | 10/1970 | Wengen | H01B 17/306 | 174/145 |
| 3,711,818 A * | 1/1973 | Swehla | H01R 13/53 | 174/73.1 |
| 3,740,700 A * | 6/1973 | Robertson | H01F 27/04 | 174/73.1 |
| 3,768,065 A * | 10/1973 | Zemels | H01R 13/56 | 174/73.1 |
| 3,845,458 A * | 10/1974 | Himi | H01R 4/00 | 174/21 JS |
| 3,853,375 A * | 12/1974 | McClain | H01R 13/53 | 439/480 |
| 3,883,208 A * | 5/1975 | Sankey | H01R 13/53 | 439/101 |
| 3,918,786 A * | 11/1975 | Chaney | H01R 13/62933 | 29/259 |
| 3,924,919 A * | 12/1975 | McClain | H01R 13/53 | 439/480 |
| 3,959,869 A * | 6/1976 | Wyman | H01R 11/14 | 29/240 |
| 3,980,374 A * | 9/1976 | Fallot | H01R 13/53 | 174/72 R |
| 3,998,520 A * | 12/1976 | Zemels | H01R 13/53 | 439/814 |
| 4,202,591 A * | 5/1980 | Borgstrom | H01R 13/53 | 218/156 |
| 4,354,721 A * | 10/1982 | Luzzi | H01R 13/53 | 439/306 |
| 4,722,694 A * | 2/1988 | Makal | H01R 13/53 | 439/181 |
| 4,776,089 A * | 10/1988 | Schoenwetter | B25B 27/14 | 29/758 |
| 4,779,341 A * | 10/1988 | Roscizewski | B25B 13/48 | 29/271 |
| 4,799,895 A * | 1/1989 | Borgstrom | H01R 13/53 | 439/183 |
| 4,857,021 A * | 8/1989 | Boliver | H01R 13/53 | 439/801 |
| 4,865,559 A * | 9/1989 | Clabburn | H01R 13/53 | 439/281 |
| 4,955,823 A * | 9/1990 | Luzzi | H01R 13/53 | 439/507 |
| 5,114,357 A * | 5/1992 | Luzzi | H01R 13/53 | 439/183 |
| 5,421,750 A * | 6/1995 | Crotty | H01R 13/53 | 439/801 |
| 6,042,407 A * | 3/2000 | Scull | H01R 13/53 | 439/181 |
| 6,364,216 B1 * | 4/2002 | Martin | H01R 13/53 | 439/181 |
| 6,520,795 B1 * | 2/2003 | Jazowski | H01R 25/003 | 439/475 |
| 7,199,571 B2 * | 4/2007 | Johnson | G01R 15/16 | 324/133 |
| 7,278,889 B2 * | 10/2007 | Muench | H01R 13/53 | 439/729 |
| 7,413,455 B2 * | 8/2008 | Hughes | H01R 13/53 | 439/187 |
| 7,488,916 B2 * | 2/2009 | Muench | H01H 33/66207 | 218/120 |
| 7,503,785 B2 * | 3/2009 | Stepniak | G01R 15/16 | 439/187 |
| 7,870,668 B2 * | 1/2011 | Hughes | H01R 13/53 | 29/857 |
| 7,878,849 B2 * | 2/2011 | Hughes | H01R 11/26 | 439/578 |
| 8,018,707 B2 * | 9/2011 | Yaworski | H01C 7/12 | 361/117 |
| 8,038,457 B2 * | 10/2011 | Hughes | H01H 33/66207 | 439/181 |
| 8,388,381 B2 * | 3/2013 | Borgstrom | H01R 13/5216 | 439/626 |
| 8,408,925 B2 * | 4/2013 | Borgstrom | H01R 3/00 | 439/181 |
| 8,602,800 B2 * | 12/2013 | Borgstrom | H01R 13/53 | 439/181 |
| 8,616,908 B2 * | 12/2013 | Siebens | H01R 13/443 | 439/301 |
| 9,112,322 B2 * | 8/2015 | Siebens | H01R 25/006 | |
| 9,124,015 B2 * | 9/2015 | Siebens | H01R 13/40 | |
| 9,225,075 B2 * | 12/2015 | Kawasaki | B61G 5/10 | |
| 9,293,872 B2 * | 3/2016 | Mikli | H01R 24/20 | |
| 9,350,103 B2 * | 5/2016 | Siebens | H01R 13/207 | |
| 9,350,123 B2 * | 5/2016 | Siebens | H01R 9/18 | |
| 9,437,374 B2 * | 9/2016 | Siebens | H01H 9/12 | |
| 2007/0291442 A1 * | 12/2007 | Steinbrecher | H01R 13/53 | 361/614 |
| 2016/0240979 A1 * | 8/2016 | Joo | H01R 13/53 | |

FOREIGN PATENT DOCUMENTS

| | | |
|---|---|---|
| JP | 2002345131 A | 11/2002 |
| WO | 2004049530 A1 | 6/2004 |

OTHER PUBLICATIONS

The International Bureau of WIPO, International Preliminary Report on Patentability for International Application No. PCT/US2015/025230 mailed Oct. 20, 2016.

\* cited by examiner

CONDUCTOR ASSEMBLY FOR POWER DISTRIBUTION EQUIPMENT

CROSS-REFERENCE TO RELATED APPLICATIONS

This application is a continuation of U.S. patent application Ser. No. 14/682,199 filed on Apr. 9, 2015, which claims the benefit of U.S. Provisional Application No. 61/977,992 filed on Apr. 10, 2014, the entire disclosures of which are incorporated herein by reference.

TECHNICAL FIELD

The present disclosure relates generally to electrical power distribution equipment, and more particularly relates to a conductor assembly for interconnecting electrical equipment such as switchgear in the power distribution system.

BACKGROUND

This section provides background information related to the present disclosure that is not necessarily prior art.

A busbar assembly is used for interconnection of multiple electrical equipment units within a power distribution system. The busbar assembly must be configured to attach and electrically couple with an electrical equipment unit, such as a switchgear unit. For example, a busbar assembly is used to interconnect multiple pole units within a switchgear unit in the power distribution system. It is important to provide a rigid connection between the electrical equipment units for adequate electrical coupling therebetween, and to avoid dielectric breakdown in the interconnect areas.

Relative positional variation between the electrical equipment units may create difficulties when attempting to provide a rigid connection between the electrical equipment units. For example, the connection points between two switchgear units may not be properly aligned such that the busbar assembly must accommodate a misalignment. In conventional busbar assemblies, a flexible cable is used between connectors coupled to the switchgear units. While this has been shown to provide effective coupling between the electrical equipment, it does not provide a rigid connection therebetween.

Improved electrical coupling may be achieved with the use of a conductive rod between the contact points that provides for a rigid connection. However, because the conductive rod cannot provide accommodate misalignment between the electrical equipment units, the busbar assembly should provide additional structure that provides this functionality.

Accordingly, it is desirable to provide a busbar assembly that includes a conductive rod and connectors which account for positional misalignment between the electrical equipment, while providing a rigid electrical coupling with the busbar assembly. In addition, it is desirable to provide a bus bar assembly that may he readily configured for different power distribution systems and various interconnections therebetween. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

A conductor assembly and a power distribution system are provided for establishing a connection to an electrical equipment unit such as a switchgear unit. The conductor assembly includes a conductor having a rigid conductive rod surrounded by an insulator sleeve. The conductive rod has an end extending from the insulator sleeve and a ball member formed on the end thereof. A connector includes an insulator body having an interface configured to attach to the electrical equipment unit. A clamp mechanism is disposed in the insulator body and configured to electrically couple with the electrical equipment unit. The end of the conductor is received in a passage formed in the insulator body such that the ball member engages and electrically couples with the clamp mechanism.

The conductor assembly may be readily configured to interconnect more than one conductor to the electrical equipment unit. In this configuration, the conductor assembly also includes a second conductor having a second conductive rod surrounded by a second insulator sleeve. The second conductive rod has a second end extending from the second insulator sleeve and a second ball member formed on the second end thereof. A second clamp mechanism is disposed in the insulator body and configured to electrically couple with the electrical equipment unit. The second end of the second conductor is received in a second passage formed in the insulator body such that the second ball member engages and electrically couples with the second clamp mechanism.

Example embodiments will now be described more fully with reference to the accompanying drawings. There is no intention to be limited by any principle presented in the preceding background or the following detailed description.

Figure 1:
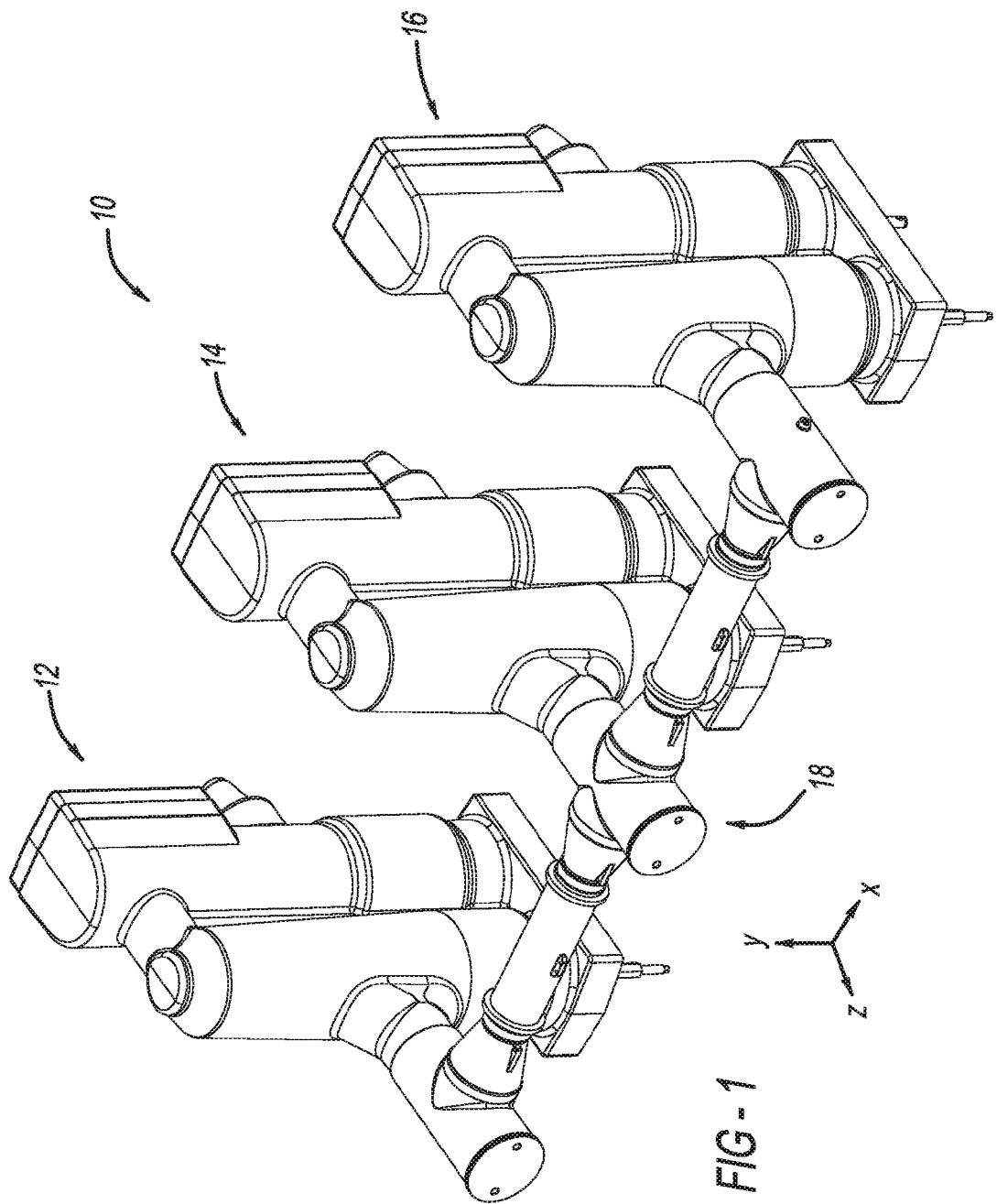
FIG. 1 is a perspective view illustrating three switchgear unit interconnected by a busbar assembly.
Figure 2:
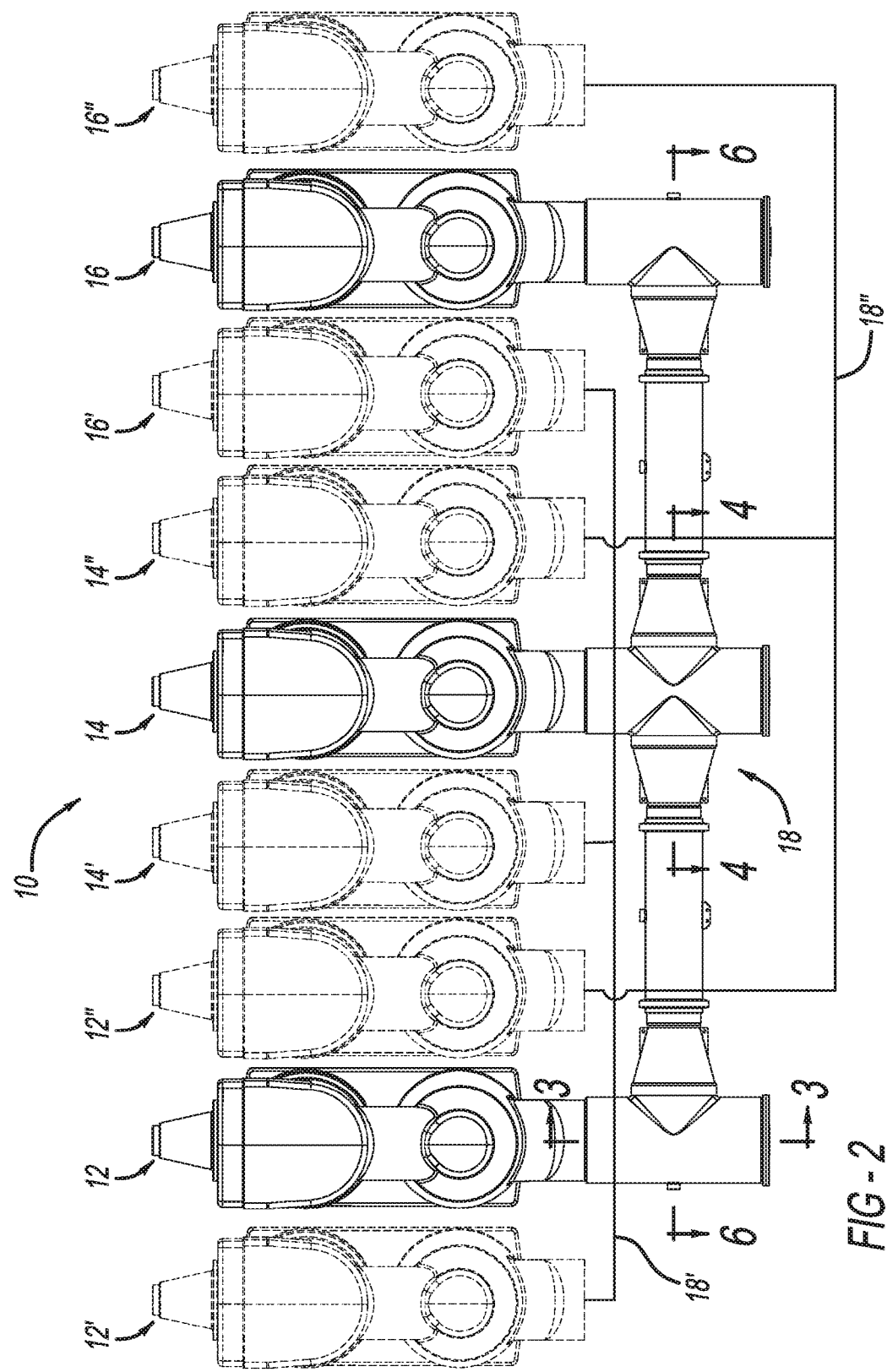
FIG. 2 is a top view of the sys shown in FIG. 1 and showing additional switchgear units in broken lines.
Figure 3:
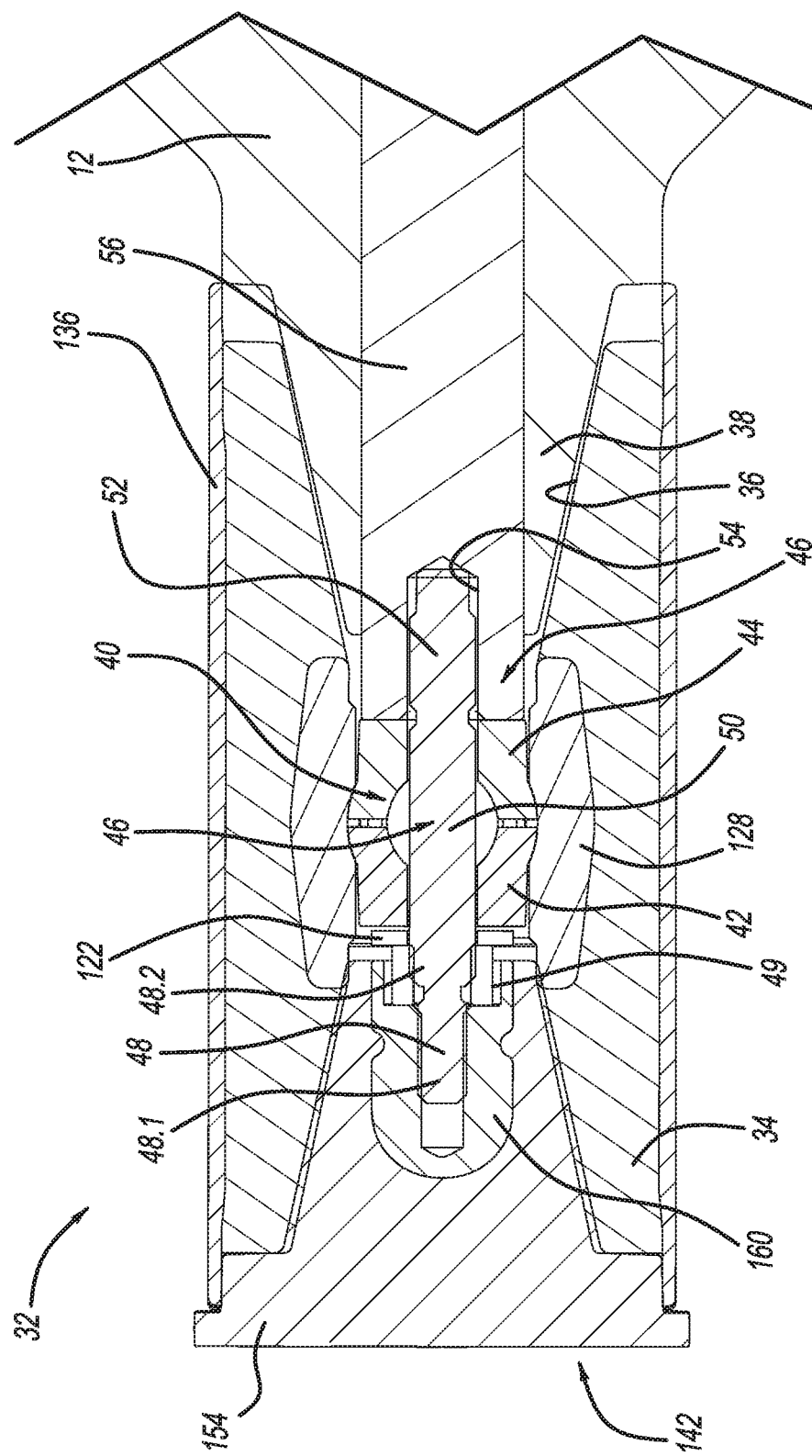
FIG. 3 is a partial cross-section view taken through 3-3 shown in FIG. 2.

With reference now to FIGS. 1 and 2, a portion of a power distribution system is illustrated which includes a switchgear unit 10 having a set of pole units 12, 14, 16 interconnected by a busbar assembly 18. FIG. 1 illustrates a first set of pole units 12, 14, 16 for one phase of a three-phase power distribution system interconnected by the busbar assembly 18. FIG. 2 schematically illustrates a switchgear unit 10 having a second set of pole units 12', 14' 16' (in broken lines) interconnected by a second busbar assembly 18' and a third set of pole units 12", 14", 16" (in broken lines) interconnected by a third busbar assembly 18". One skilled in the art will appreciate that second busbar assembly 18' and third busbar assembly 18″ are substantially similar to first busbar assembly 18. Accordingly, further discussion concerning the structure and functions of the component of the busbar assemblies will refer to first busbar assembly 18.

Figure 4:
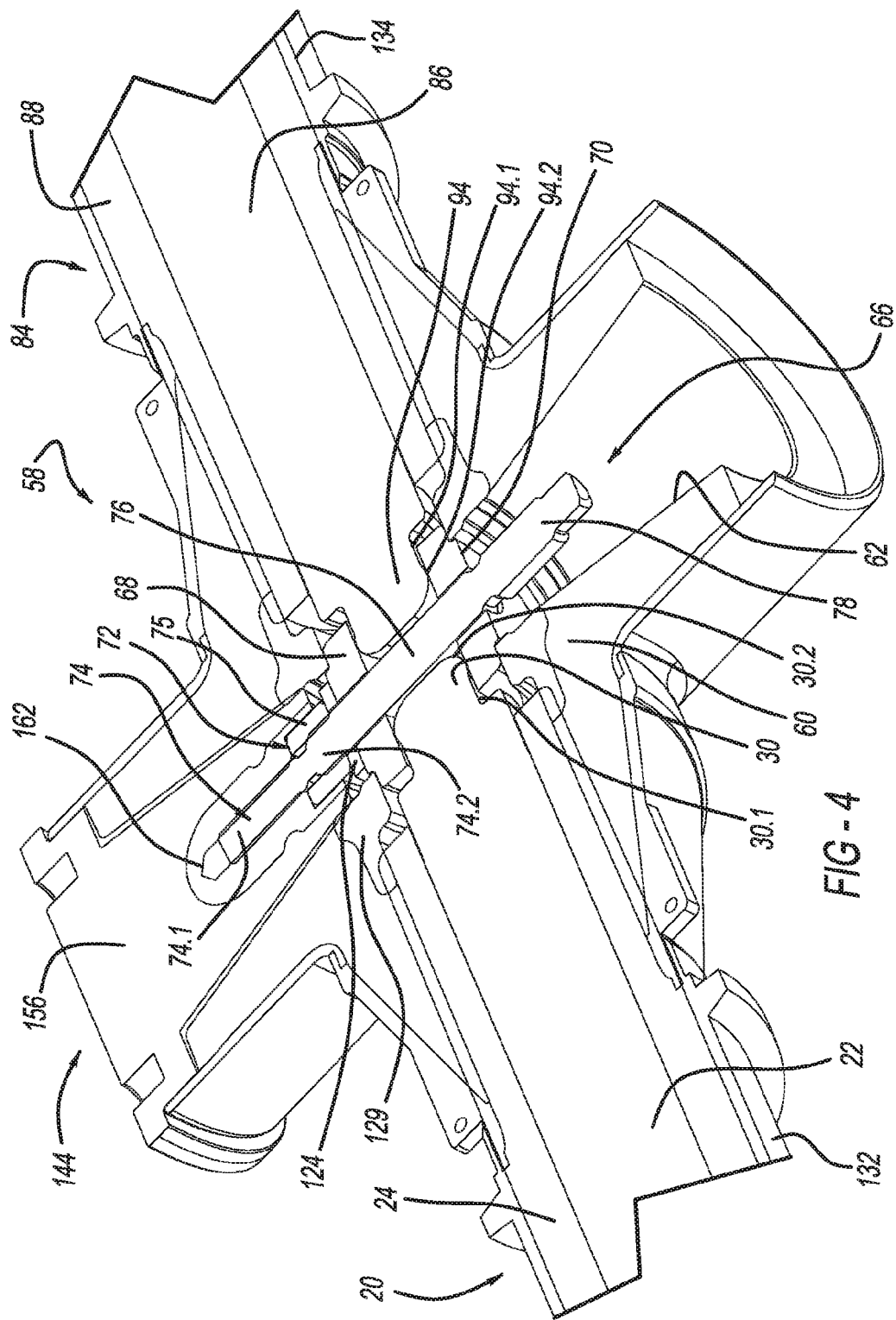
FIG. 4 is a partial cross-section view taken through 4-4 in FIG. 2.
Figure 5:
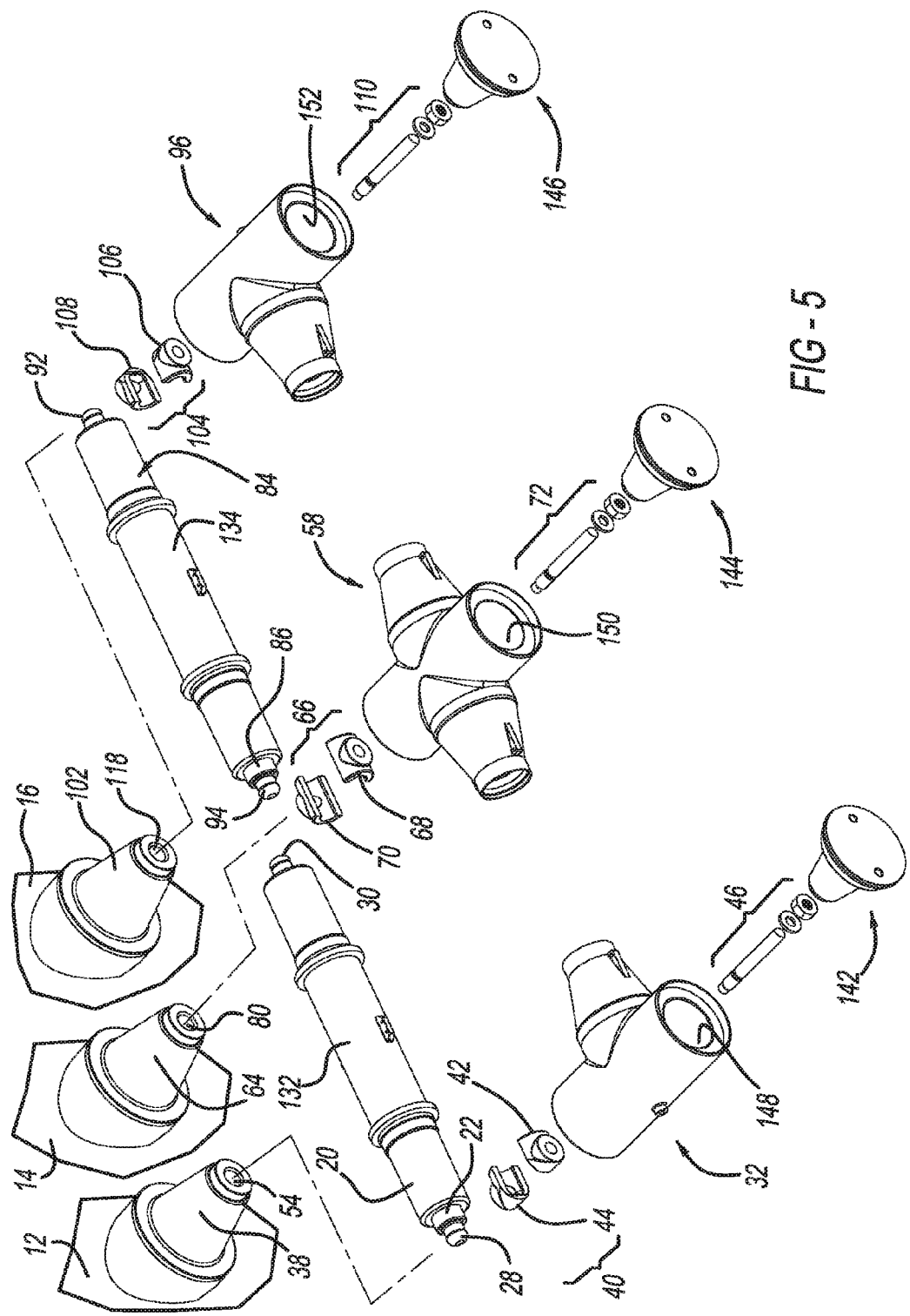
FIG. 5 is an expanded view of the adjustable busbar shown in FIG. 1; and 1
Figure 6:
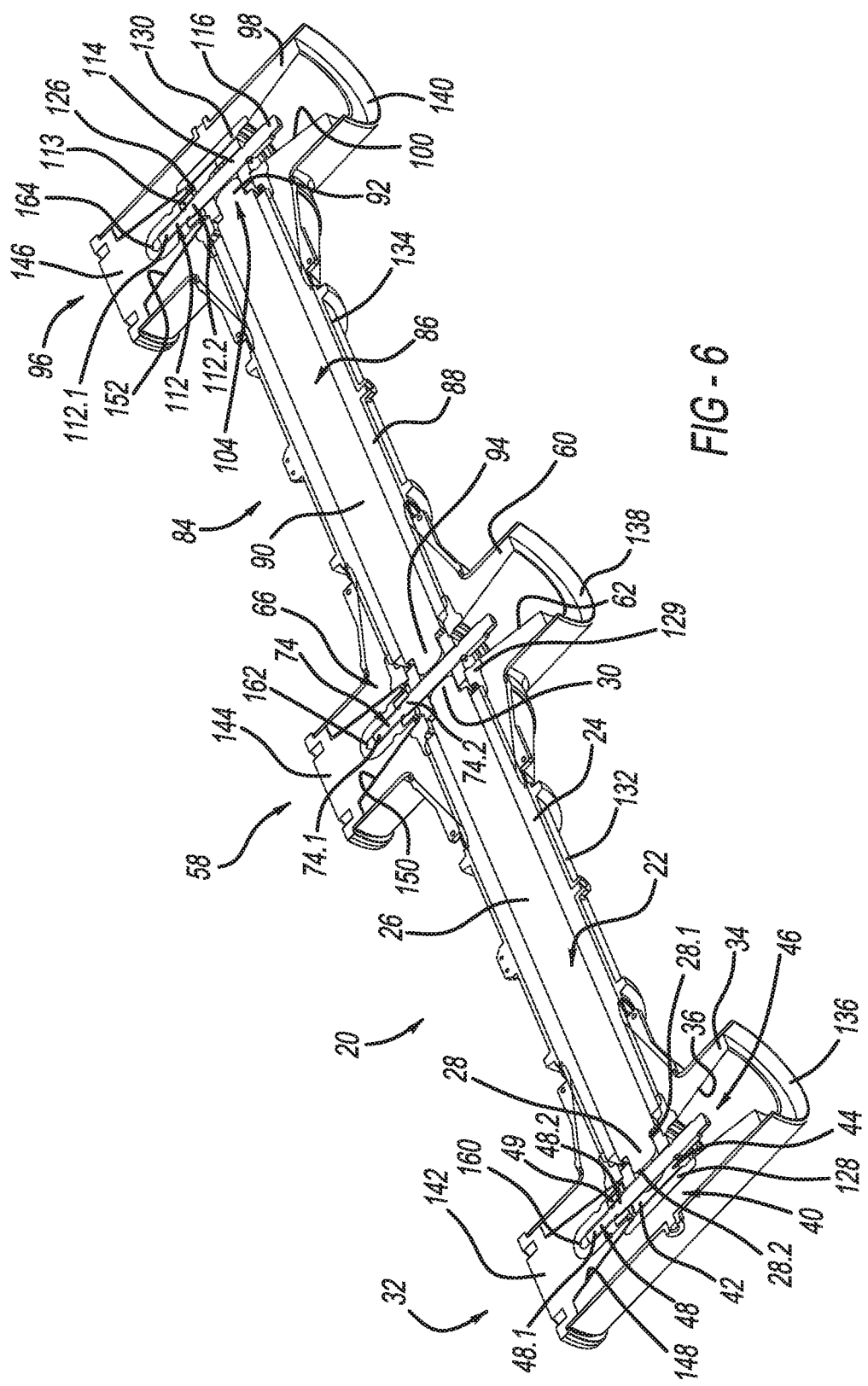
FIG. 6 is a cross-section of the busbar shown in FIG. 5 in assembled form.

With reference now to FIGS. 3-6, the busbar assembly 18 includes a molded bus or first conductor assembly (or simply "first conductor") 20 having a conductive rod 22 surrounded by an insulator sleeve 24. As best seen in FIGS. 4 and 5, the conductive rod 22 includes a body portion 26, a first end 28 and a second end 30. Each of the first and second ends 28, 30 extends from the insulator sleeve 24 and has a neck portion 28.1, 30.1 and a head portion 28.2, 30.2, each defining a ball member. As presently preferred, the head portions 28.2, 30.2 form a spherical end portion having a contact surface.

With continued reference now to FIGS. 3-6, the busbar assembly 18 includes a first connector 32 configured to attach to pole unit 12. The first connector 32 includes an insulator body 34 having an interface 36 (e.g., a tapered interior surface) configured to attach to the connector 38 of pole unit 12. A clamp mechanism 40 in the form of an end clamp pair is disposed in insulator body 34 and includes a first clamp element 42, a second clamp element 44 and a fastener 46. The fastener 46 includes ahead portion 48 having a first threaded portion 48.1 and a second threaded portion 48.2 receiving a nut 49, and a shank 50 extending from the threaded head portion 48 that passes through the first and second clamp elements 42, 44. A threaded body portion 52 formed at the end of shank 50 is configured to engage a tapped hole 54 in the conductor of pole unit 12. The fastener 46 functions to secure the first and second clamp elements 42, 44 around the first end 28 of the conductor 20. The fastener 46 may further include a biasing element 122 such as a Belleville washer interposed between the nut 49 and the first clamp element 42 to tension the threaded coupling into tapped hole 54. Connector 32 has a semi-conductive boot 128 surrounding the clamp mechanism 40 and the first end 28 of the conductive rod 22. Connector 32 further includes a plug assembly 142 threaded into recess 148. The plug assembly 142 includes an insulator body 154 threadably received in recess 148 and an aluminum insert 160 that threads onto threaded portion 48.1 of fastener 46.

A second connector 58 includes an insulator body 60 having an interface 62 (e.g., a tapered interior surface) configured to attach to the connector 64 of pole unit 14. A clamp mechanism 66 in the form of a center clamp pair is disposed in insulator body 60 and includes a first clamp element 68, a second clamp element 70 and a fastener 72. The fastener 72 includes a head portion 74 having a first threaded portion 74.1 and a second threaded portion 74.2 receiving a nut 75, and a shank 76 extending from the threaded head portion 74 that passes through the first and second clamp elements 68, 70. A threaded body portion 78 is formed at the end of the shank 76 and configured to engage a tapped hole 80 in the conductor of pole unit 14. The clamp mechanism 66 functions to secure the first and second clamp elements 68, 70 around the second end 30 of the conductor 20. The clamp mechanism 66 also functions to secure the first and second clamp elements 68, 70 around second end 94 of the conductor 84 as further described below. The fastener 72 may further include a biasing element 124 such as a Belleville washer interposed between the nut 75 and the first clamp element 68 to tension the threaded coupling into tapped hole 80. Connector 58 has a semi-conductive boat 129 surrounding the clamp mechanism 66 and the second ends 30, 94 of the conductive rods 22, 86. Connector 58 further includes a plug assembly 144 threaded into recess 150. The plug assembly 144 includes an insulator body 156 threadably received in recess 150 and an aluminum insert 162 that threads onto first threaded portion 74.1 of fastener 72.

In power distribution systems having more than two electrical equipment units interconnected, the busbar assembly 18 further includes a second molded bus or conductor assembly (or simply "second conductor") 84 that is similar to the first conductor 20. The second conductor 84 includes a conductive rod 86 surrounded by an insulator sleeve 88. The conductive rod 86 includes a body portion 90, a first end 92 and a second end 94. Each of the first and second ends 92, 94 extends from the insulator sleeve 88 and has a neck portion 92.1, 94.1 and ahead portion 92.2 to 94.2 defining a ball member. As presently preferred, the head portion 92.2, 94.2 forms a spherical end portion having a contact surface.

A third connector 96 is configured to attach to pole unit 16. The third connector 96 includes an insulator body 98 having an interface 100 (e.g., a tapered interior surface) configured to attach to the connector 102 of pole unit 16. A clamp mechanism 104 in the form of an end clamp pair is disposed in insulator body 98 and includes a first clamp element 106, a second clamp element 108 and a fastener 110. The fastener 110 includes a head portion 112 having a first threaded portion 112.1 and a second threaded portion 112.2 receiving a nut 113, and a shank 114 extending from the fastener head 112 that passes through the first and second clamp elements 106, 108. A threaded body portion 116 formed at the end of shank 114 is configured to engage a tapped hole 118 in the conductor of pole unit 16. The clamp mechanism 104 functions to secure the first and second clamp elements 106, 108 around the first end 92 of the second conductor 84. The fastener 110 may further include a biasing element 126 such as a Belleville washer interposed between the nut 113 and the first clamp element 106 to tension the threaded coupling into the tapped hole 118. Connector 96 has a semi-conductive boot 130 surrounding the clamp mechanism 104 and the first end 92 of the conductive rod 86. Connector 96 further includes a plug assembly 146 threaded into recess 152. The plug assembly 152 includes an insulator body 158 threadably received in recess 152 and an aluminum insert 164 that threads onto the first threaded portion 112.1 of fastener 110.

The busbar assembly 18 illustrated in the figures provides a three-way interconnect for pole units of a single phase and includes conductors 20, 84, and connectors 32, 58, 96. The first and third connectors 32, 96 are end connectors that function to terminate the busbar assembly 18. The second connector 58 is an intermediate connector that functions to extend the busbar assembly 18 from the first conductor 20 to the second conductor 84. One skilled in the art will appreciate that the connectors and conductors described herein may be assembled into a busbar assembly that provides a two-way interconnect for two pole units of a single phase by eliminating the intermediate connector, or a busbar assembly that provides for an interconnect for more than three pole units of a single phase by adding additional intermediate connectors and conductors.

As presently preferred, the conductive rods 22, 86 are rigid aluminum rods, and insulator sleeves 24, 88 are made of a dielectric material that electrically insulates the conductive rods 22, 86. Likewise, the first clamp elements 42, 68, 106 and the second clamp elements 44, 70, 108 are made of metal and may have an aluminum or copper plating to improve electrical contact with the conductive rods 22, 86. The interfaces 36, 62, 100 shown in the figures are illustrated as tapered interior surfaces, but one skilled in the art will appreciate that the insulator body 34, 60, 98 may include any suitable interface for attaching the busbar assembly 18 to connectors 38, 64, 102 of electrical equipment units such as pole units 12, 14, 16 respectively.

As presently preferred, conductors 20, 84 have a conductive covering 132, 134 on insulator sleeves 24, 88 and connectors 32, 58, 96 have a conductive covering 136, 138, 140 on insulator body 34, 60, 98. Conductive coverings 132-140 are conductively coupled when the busbar assembly 18 is assembled together. A grounding wire (not shown) may extend between the conductive coverings 132-140 for grounding the busbar assembly 18.

To install the busbar assembly 18, the threaded body 52, 78, 116 of fastener 46 72, 110 is threaded into tapped hole 54, 80, 118, respectively. The clamp mechanism 40, 66, 104 are then positioned in connectors 32, 58, 96, respectively. Conductor 20, 84 are inserted into connectors 32, 96 so that first ends 28, 92 are located into clamp mechanism 40, 104. Conductors 20, 84 are inserted into connector 58 so that second ends 30, 94 are located into clamp mechanism 66. So assembly, this adjustable busbar assembly may be located on pole unit 12, 14, 16.

In particular, busbar connectors 32, 58 96 are positioned over pole unit connectors 38, 64, 102, respectively. Shank 50, 76, 114 extends through clamp mechanism 40, 66, 104, respectively to reveal threaded head portion 48, 74, 112 in recess 148, 158 152. The adjustable busbar accommodates misalignment between the pole units 12, 14, 16 by allowing the ball members to move within the clamping mechanism. Once the connector 32, 58, 96 are positively located onto the pole units, biasing element 122, 124, 126 and nut 49, 75, 113 are secured onto the threaded head portion 48, 74, 112 of fasteners 46, 72, 110 to clamp the clamp mechanism 40, 66, 104 over first ends 28, 92 and second ends 30, 94, respectively. As presently preferred, nut 49, 75, 113 is tightened to a torque rating of about 50 to 60 ft-lbs. Lastly, the plug assembly 142, 144, 146 is located into recess 148, 150, 152 for sealing the connector 32, 58, 96, respectively. Aluminum insert 160, 162, 164 is threaded onto threaded portion 48.1, 74.1, 112.1 for securing the plug assembly 142, 144, 146 onto connector 32, 58, 96, respectively. As presently preferred, the plug assembly 142, 144, 144 is tightened to a torque rating of about 25 to 35 ft.-lbs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A conductor assembly for establishing an electrical connection to a power distribution unit comprising:
    a conductor including a conductive rod surrounded by an insulator sleeve, the conductive rod having an end extending from the insulator sleeve and a ball member formed on the end; and
    a connector including an insulator body having an interface configured to attach to the power distribution equipment and a clamp mechanism disposed in the insulator body and configured to electrically couple with the power distribution unit, wherein the end of the conductor is received in a passage formed in the insulator body such that the ball member engages and electrically couples with the clamp mechanism.

2. The conductor assembly of claim 1 further comprising a second conductor including a second conductive rod surrounded by an second insulator sleeve, the second conductive rod having a second end extending from the second insulator sleeve and a second ball member formed on the second end, wherein the clamp mechanism comprises a dual clamping mechanism having a first clamp on the ball member and a second clamp on the second ball member.

3. The conductor assembly of claims 1, wherein the clamp mechanism comprises a first clamp element, a second clamp element and a fastener received in a recess passage formed in the insulator body, the fastener extending through the first and second clamp elements to secure the clamp mechanism to the ball member of the conductive rod.

4. The conductor assembly of claim 3 wherein the fastener comprises a threaded head portion, a nut received on the threaded head portion, a shank extending from the threaded head portion and passing through the first and second clamp elements, and a threaded body portion configured to engage with the power distribution unit.

5. The conductor assembly of claim 4 further comprising a plug assembly comprising an insulator portion disposed within the recess passage and a threaded insert engaging the threaded head portion of the fastener, wherein the plug assembly is configured to sealably engage the connector.

6. The conductor assembly of claim 5 wherein the fastener further comprises a biasing element interposed between the nut and the first clamp element.

7. The conductor assembly of claims 1 wherein the connector further comprises a semi-conductive boot surrounding the clamp mechanism and the end of the conductor.

8. The conductor assembly of claims 1 Wherein the conductor rod further comprise a body portion, a neck portion extending from the body portion and a spherical end portion, the neck portion and the spherical end portion joining to form a contact surface and defining the ball member.

9. The conductor assembly of claims 1 further comprising a conductive covering including a conductor portion formed on the conductor, and a connector portion formed on the connector, wherein the conductor portion and the connector portion are conductively coupled when the connection assembly is assembled.

10. A power distribution system comprising:
    a power distribution unit having a contact;
    a conductor including a conductive rod surrounded by an insulator sleeve, the conductive rod having an end extending from the insulator sleeve and a ball member formed on the end; and
    a connector including an insulator body having interface configured to attach to the power distribution equipment and a clamp mechanism disposed in the insulator body and configured to electrically couple with the power distribution unit, wherein the end of the conductor is received in a passage formed in the insulator body such that the ball member engages and electrically couples with the clamp mechanism.

11. The power distribution system of claim 10 further comprising a second conductor including a second conductive rod surrounded by an second insulator sleeve, the second conductive rod having a second end extending from the second insulator sleeve and a second ball member formed on the second end, wherein the clamp mechanism comprises a dual clamping mechanism having a first clamp on the ball member and a second clamp on the second ball member.

12. The power distribution system of claim 10 wherein the clamp mechanism comprises a first clamp element, a second clamp element and a fastener received in a recess passage formed in the insulator body, the fastener extending through the first and second clamp elements to secure the clamp mechanism to the ball member of the conductive rod.

13. The power distribution system of claim 12 wherein the fastener comprises a threaded head portion, a nut engaging the threaded head portion, a shank extending from the threaded head portion and passing through the first and second clamp elements, and a threaded body portion configured to engage with the contact on the power distribution unit.

14. The power distribution system of claim 13 wherein further comprising a plug assembly comprising an insulator portion disposed within the recess passage and a threaded insert engaging the threaded head portion of the fastener, wherein the plug assembly is configured to sealably engage the connector.

15. The power distribution system of claim 14 wherein the fastener further comprises a biasing element interposed between the nut and the first clamp element.

16. The power distribution system of claims 10 wherein the connector comprises a semi-conductive boot surrounding the clamp mechanism and the end of the conductor.

17. The power distribution system of claims 10 wherein the conductor rod comprises a body portion, a neck portion extending from the body portion and a spherical end portion, the neck portion and the spherical end portion joining to form a contact surface and define the ball member.

18. The power distribution system of claims 10 further comprising a conductive covering including a conductor portion on the conductor, and a conductor portion on the connector, wherein the conductor portion and the connector portions are conductively coupled.

* * * * *